United States Patent
Bertolini et al.

(10) Patent No.: US 11,626,799 B2
(45) Date of Patent: Apr. 11, 2023

(54) CONVERTER CIRCUIT, CORRESPONDING DEVICE AND METHOD

(71) Applicant: STMicroelectronics S.r.l., Agrate Brianza (IT)

(72) Inventors: Alessandro Bertolini, Vermiglio (IT); Alberto Cattani, Ciclago (IT); Stefano Ramorini, Milan (IT); Alessandro Gasparini, Cusano Milanino (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 21 days.

(21) Appl. No.: 17/393,243

(22) Filed: Aug. 3, 2021

(65) Prior Publication Data

US 2022/0045608 A1 Feb. 10, 2022

(30) Foreign Application Priority Data

Aug. 6, 2020 (IT) .................. 102020000019546

(51) Int. Cl.
*H02M 3/158* (2006.01)
*H02M 1/00* (2006.01)

(52) U.S. Cl.
CPC ......... *H02M 3/158* (2013.01); *H02M 1/0025* (2021.05)

(58) Field of Classification Search
CPC .. H02M 3/158; H02M 1/0025; H02M 1/0032; H02M 1/0048
See application file for complete search history.

(56) References Cited

U.S. PATENT DOCUMENTS

| 6,456,508 B1 * | 9/2002 | Namai | H02M 1/10 318/116 |
| 2009/0302817 A1 * | 12/2009 | Nagai | H02M 3/156 323/282 |
| 2012/0139507 A1 | 6/2012 | Ferguson | |

OTHER PUBLICATIONS

IT Search Report and Written Opinion for IT Appl. No. 102020000019546 dated Mar. 22, 2021 (8 pages).

* cited by examiner

*Primary Examiner* — Adolf D Berhane
*Assistant Examiner* — Afework S Demisse
(74) *Attorney, Agent, or Firm* — Crowe & Dunlevy

(57) ABSTRACT

A converter circuit includes first and second electronic switches coupled at an intermediate node, with an inductor coupled between the intermediate node and an output node. Switching drive control circuitry causes the first and the second electronic switch to switch between a conductive state and a non-conductive state. The drive control circuitry includes a first feedback signal path to control switching of the first and the second electronic switch as a function of the difference between a feedback signal indicative of the signal at the output node and a reference value. A second feedback signal path includes a low-pass filter coupled to the output node and configured to provide a low-pass filtered feedback signal resulting from low-pass filtering of the output signal. The second feedback signal path compensates the feedback signal as a function of the difference between the low-pass filtered feedback signal and a respective reference value.

21 Claims, 3 Drawing Sheets

US 11,626,799 B2

CONVERTER CIRCUIT, CORRESPONDING DEVICE AND METHOD

PRIORITY CLAIM

This application claims the priority benefit of Italian Application for Patent No. 102020000019546, filed on Aug. 6, 2020, the content of which is hereby incorporated by reference in its entirety to the maximum extent allowable by law.

TECHNICAL FIELD

The description relates to converter circuits.

One or more embodiments may be applied to DC-DC converters, for instance.

BACKGROUND

DC-DC converters are extensively used in a variety of applications, for instance in order to provide supply voltage "rails" in complex systems.

Good efficiency and compliance with performance specifications are desirable for these applications.

Efficiency of these converters is found to degrade due to increased switching losses at high switching frequencies, especially under light load conditions.

Efficiency under light load conditions may have a negative impact on battery lifetime in mobile devices, for instance.

This has led to improved solutions, such as control schemes using pulse-frequency modulation (PFM), which were found to be beneficial in addressing these issues.

Solutions based on PFM have adopted various control loop approaches: constant-on-time, constant-off-time, ripple-based and hysteretic are exemplary of conventional control schemes used in PFM-based DC-DC converters.

There is a need in the art to provide further improved solutions addressing the issues discussed in the foregoing.

SUMMARY

One or more embodiments may relate to a circuit.

One or more embodiments may relate to a corresponding device. A device or system including a supply rail based on a circuit as discussed herein may be exemplary of such a device.

One or more embodiments may relate to a corresponding method.

One or more embodiments may offer one or more of the following advantages:

a closed-loop solution is provided, which facilitates compensating output offset with respect to a desired setpoint which may be related to process, voltage and temperature (PVT) variations, aging, component de-rating and similar phenomena without dependency on operating parameters;

the impact on the overall current consumption is low and practically negligible: extra consumption is related (only) to an operational amplifier and an added PMOS acting as a controlled current source; the overall efficiency and power consumption of a DC-DC converter is substantially unaffected;

in comparison with conventional DC-DC converters or power management integrated circuit (PMIC) arrangements, the differences in terms of system complexity and occupied semiconductor area are minor and the small complexity added is largely compensated by improved performance;

a matched layout can be resorted to in order to reduce possible mismatch between two feedback dividers, with the added possibility of employing diffused resistors with good performance in terms of matching;

high accuracy can be facilitated by a trimming action to mitigate the effects of possible residual mismatches between the two feedback dividers and the operational amplifier, with the possibility of resorting to known techniques (chopping, for instance) to provide an error amplifier with a reduced offset and negligible mismatch; and one or more embodiments can be used, without specific restrictions, with various types of DC-DC converters operating with PFM: ripple-based, hysteretic, Constant-On-Time (COT), Advanced or Adaptive Constant-On Time (ACOT®), time-based, and so on.

In an embodiment, a circuit comprises: a first electronic switch and a second electronic switch having current paths therethrough coupled at an intermediate node; an inductor having a first terminal coupled to the intermediate node and a second terminal coupled to an output node where an output signal is generated; and drive control circuitry configured to control switching of the first electronic switch and the second electronic switch between a conductive state and a non-conductive state, wherein the first electronic switch during the conductive state provides for current flow between an input node and said intermediate node and wherein the second electronic switch during the conductive state provides for current flow between said intermediate node and ground. The drive control circuitry comprises: a first feedback signal path coupled to said output node and configured to control switching of the first electronic switch and the second electronic switch between said conductive state and said non-conductive state as a function of a difference between a feedback signal indicative of said output signal and a first reference value; and a second feedback signal path comprising a low-pass filter coupled to said output node and configured to provide a low-pass filtered feedback signal, the second feedback signal path configured to compensate said feedback signal as a function of a difference between said low-pass filtered feedback signal and a second reference value.

BRIEF DESCRIPTION OF THE DRAWINGS

One or more embodiments will now be described, by way of example only, with reference to the annexed figures, wherein.

DETAILED DESCRIPTION OF THE DRAWINGS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is comprised in at least one embodiment. Hence, phrases such as "in an embodiment" or "in one embodiment" that may be present in one or more points of the present description do not necessarily refer to one and the same embodiment.

Moreover, particular conformations, structures, or characteristics may be combined in any adequate way in one or more embodiments.

The headings/references used herein are provided merely for convenience and hence do not define the extent of protection or the scope of the embodiments.

As discussed previously, DC-DC converters are extensively used in a variety of applications, for instance in order to provide supply "rails" in complex systems.

Efforts to achieve compliance with performance specifications and efficiency (which is found to degrade at high switching frequencies, especially under light load conditions, with a negative impact on battery lifetime in mobile devices, for instance) has led to improved solutions, such as control schemes using pulse-frequency modulation (PFM) using constant-on-time, constant off-time, ripple-based, hysteretic, just to mention a few, which were found to be beneficial in addressing these issues.

In fact, loss mechanisms in pulse-width modulation (PWM) controlled DC-DC converters can be broadly classified in three categories, namely conduction loss, switching loss, and static loss due to quiescent current consumed by the controller and other auxiliary circuitry.

For a fixed switching frequency $F_{SW}$, the switching loss and static loss components are constant while conduction loss scales up as a function of the load current.

Figure 1A:
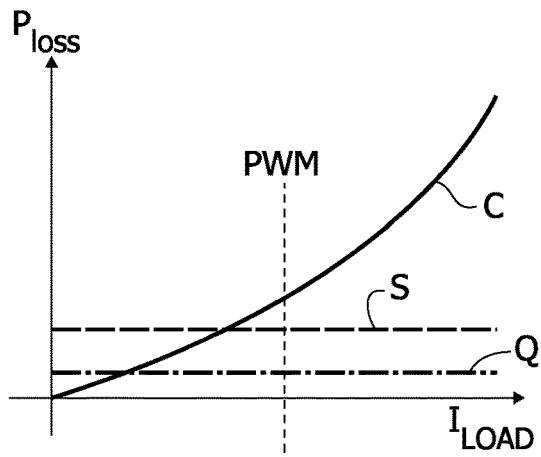
FIGS. 1A and 1B are diagrams exemplary of possible behaviors of loss and efficiency versus load current in pulse-width modulation (PWM) mode and pulse-frequency modulation (PFM) mode converters.

This is exemplified in the curves of the diagram of FIG. 1A.

These curves represent, against a common abscissa scale (load current $I_{LOAD}$): switching losses S, static (quiescent) losses Q and conduction losses C as shown in the upper curve; and efficiency η as shown in the lower curve.

FIG. 1A shows that conduction losses C and switching losses S dominate at high and light loads, respectively.

Quiescent current losses Q affect efficiency at (very) small loads and are not a primary source of concern.

Switching losses S are found to increase with the switching frequency and can be reduced by scaling $F_{SW}$.

To that effect, a PFM control can operate in a discontinuous-conduction-mode (DCM) and scale $F_{SW}$ as a function (proportional, for instance) of the load current $I_{LOAD}$, which facilitate achieving improved light-load efficiency.

Figure 1B:
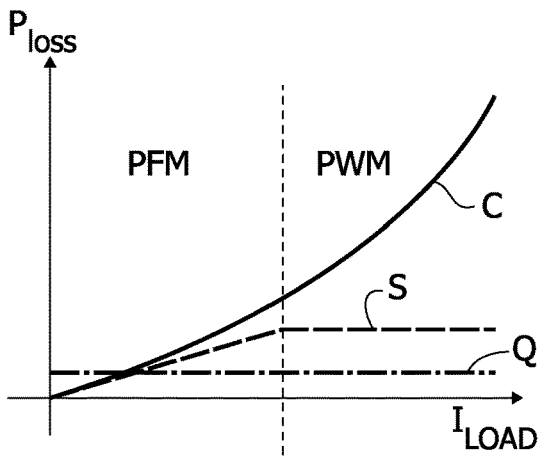
Figure 1B:
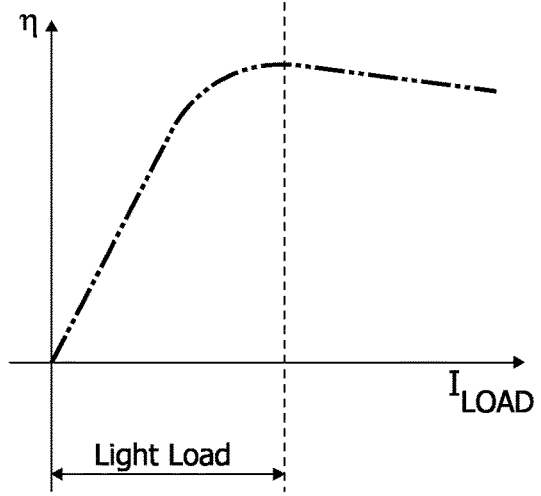
Figure 1B:
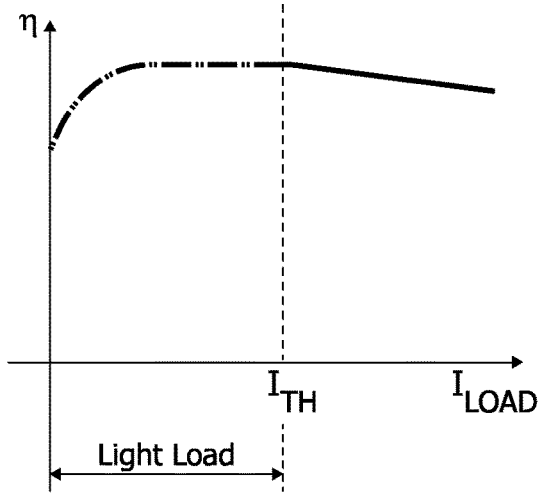

This is exemplified in the curves of the diagram of FIG. 1B.

These curves again represent against a common abscissa scale (load current $I_{LOAD}$): switching losses S, static (quiescent) losses Q and conduction losses C as shown in the upper curve; and efficiency η as shown in the lower curve, with reference to PFM mode applied for $I_{LOAD}$ below a threshold value $I_{TH}$.

It is noted that efficiency in a PFM mode degrades at larger values of $I_{LOAD}$, which suggests operating the converter in a PWM mode for currents in excess of $I_{TH}$.

Figure 2:
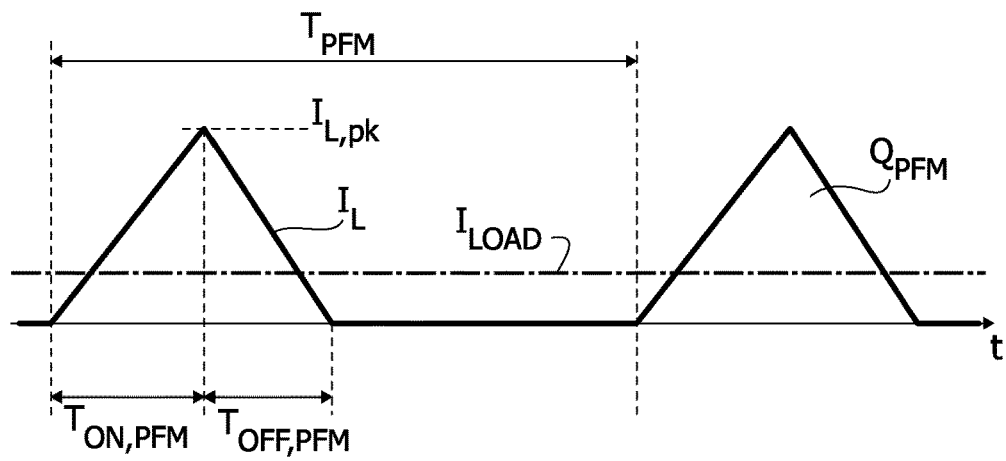
FIG. 2 is a diagram exemplary of possible inductor current waveforms in a PFM mode converter.

The diagram in FIG. 2 is exemplary of output voltage regulation in a PFM mode for a buck converter (this can be held to be representative of various types of DC-DC topologies) referring for simplicity to an inductor current $I_L$.

As exemplified in FIG. 2, the load current $I_{LOAD}$ discharges the output capacitor and the charge lost in that process is compensated by dumping charge packets of value $Q_{PFM}$ into the output node at a PFM rate (frequency) of $F_{SW,PFM}=1/T_{PFM}$, where $T_{PFM}$ denotes the period of PFM modulation.

Assuming a fixed inductor peak current $I_{L,pk}$, $Q_{PFM}=1/2*I_{L,pk}*(T_{ON,PFM}+T_{OFF,PFM})$, where $T_{ON,PFM}$ and $T_{OFF,PFM}$ are the rise and fall times of the inductor current $I_L$ and are equal to:

$$T_{ON,PFM}=(L*I_{L,pk})/(V_{IN}-V_O), \text{ and}$$

$$T_{OFF,PFM}=(L*I_{L,pk})/V_O,$$

where $V_{IN}$ and $V_O$ are the input (supply) and output voltages of the converter.

The output voltage $V_O$ can be regulated by setting $F_{SW,PFM}$ such that the rate of charge transfer to the output is equal to $I_{LOAD}$.

This can be represented in mathematical terms as:

$$F_{SW,PFM}=(I_{LOAD}/Q_{PFM})=(2*I_{LOAD})/(I_{L,pk}*(T_{ON,PFM}+T_{OFF,PFM})).$$

It is noted that $F_{SW,PFM}$ can be varied in proportion to $I_{LOAD}$, as desired, to reduce switching losses.

Figure 3:
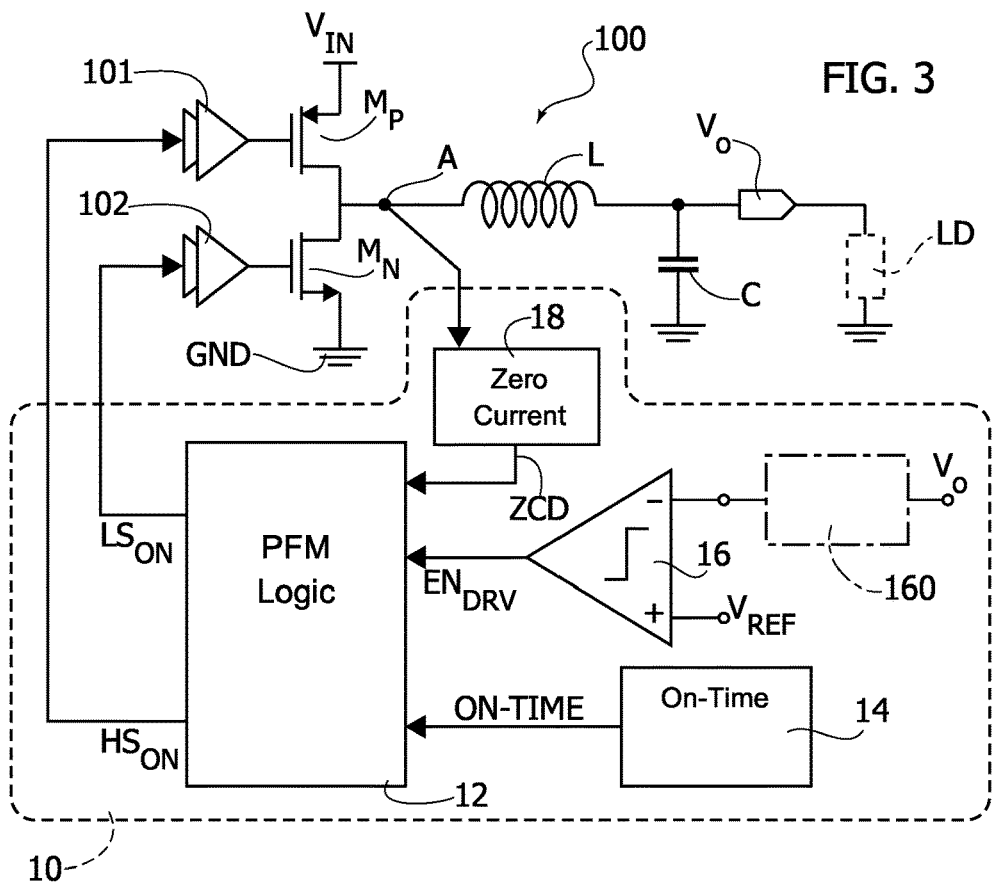
FIG. 3 is a circuit diagram illustrative of a PFM controller for a buck DC-DC converter.

FIG. 3 is a circuit diagram illustrative of a buck DC-DC converter 100 comprising a PFM controller 10.

This type of converter is taken as an example representative of various types of DC-DC topologies. Those of skill in the art will otherwise appreciate that the principles underlying the embodiments exemplified herein apply to other types of switching converters, such as, by way of non-limiting example, step-up converters (or boost converters), buck-boost and other converter topologies.

As exemplified in FIG. 3, the converter 100 comprises two electronic switches $M_P$ and $M_N$ (field effect transistors such as a P-MOS and an N-MOS) arranged with the current paths therethrough (drain-source, in the case of field-effect transistors such as mosfets) coupled—at a node A intermediate $M_P$ and $M_N$—to one end of an inductor (coil) L. The other end of the inductor L is coupled to an output node $V_O$ (via a stabilizing output capacitor C, for instance) and configured to supply a load LD.

It is noted that selecting the two electronic switches $M_P$ and $M_N$ as a P-MOS and an N-MOS transistors, respectively, is not mandatory for the embodiments. For instance, in certain embodiments, the "high-side" mosfet could be N-channel.

Also, in certain asynchronous converters, a diode can be used as the low-side electronic switch Mn in the place of a transistor such as a power mosfet.

In an arrangement as exemplified in FIG. 3, the two electronic switches $M_P$ and $M_N$ are caused to switch alternately between an "on" state (switch conductive) and an "off" state (switch non-conductive). This may be the result of drive signals applied to the control terminals (gates, in the case of field-effect transistors such as mosfets) of $M_P$ and $M_N$ by drive circuit stages 101, 102 which are in turn controlled by the controller 10 via control signals $HS_{ON}$ ("high-side" switch $M_P$) and $LS_{ON}$ ("low-side" switch $M_N$).

When "on" (conductive), the two electronic switches $M_P$ and $M_N$ provide respective current flow paths between an input (supply) node $V_{IN}$ and the intermediate node A and between the intermediate node A and ground.

The structure and operation of a converter 100 as exemplified in FIG. 3 are well known to those of skill in the art, which makes it unnecessary to provide a more detailed description herein.

It will be otherwise appreciated that throughout this description a same designation may be used for simplicity to designate a node/line and a signal appearing at that node (see, for instance $V_{IN}$ and $V_O$ as discussed previously).

Also, it will be appreciated that the load LD may be a distinct element from the embodiments.

As exemplified in FIG. 3, the controller 10 comprises PFM logic circuitry 12 which can be implemented as a dedicated logic, a finite state machine (FSM) synthesized within an ASIC, a FPGA or a microcontroller (μC)/microprocessor (μP).

As exemplified in FIG. 3, the PFM logic circuitry 12 may be configured (in a manner known per se to those of skill in the art) to produce the drive signals $HS_{ON}$ and $LS_{ON}$ for the switches $M_P$ and $M_N$ as a function of:

a timing signal ON-TIME from an "on" time generator 14;

a drive enable signal $EN_{DRV}$ from a comparator 16 which receives at its inputs the output (voltage) signal $V_O$ (or a scaled version thereof, obtained via a voltage divider, for instance) and a reference voltage $V_{REF}$; and a zero-crossing signal ZCD form a zero-crossing detector 18 sensitive to the zero crossings of the current $I_L$ at the node A intermediate the switches $M_P$ and $M_N$.

FIG. 3 also shows a block 160 representative of circuitry configured to transfer the output voltage $V_O$ to the (inverting) input of the comparator 16. The structure and operation of that circuitry will be discussed in the following in connection with FIGS. 6 and 7.

Neglecting for the time being the block 160, in a controller 10 as exemplified in FIG. 3, the comparator 16 monitors the output voltage $V_O$ (or a scaled version thereof obtained via a feedback divider such as a resistive voltage divider) and provides the signal $EN_{DRV}$ based on the following criteria:

$EN_{DRV}$=0 (e.g. a "low" logic level) when $V_O$ is higher than $V_{REF}$, that is during a state where the inductor L is not energized to transfer charge towards the converter output;

$EN_{DRV}$=1 (e.g. a "high" logic level) when $V_O$ is lower than $V_{REF}$, that is during a state where the inductor L is energized to transfer charge towards the converter output, because the output voltage $V_O$ is below a desired regulation value.

As a result of $EN_{DRV}$=1, the logic circuitry 12 produces drive signals $HS_{ON}$ and $LS_{ON}$ for the switches $M_P$ and $M_N$.

Those of skill in the art will otherwise appreciate that the logic values as indicated herein are merely exemplary: the same type of operation as discussed herein can in fact be obtained with different logic values according to the (logic) circuitry implemented.

In a controller 10 as exemplified in FIG. 3, the duration $T_{ON}$ of the active or "on" state for $HS_{ON}$ (see the ON-TIME signal in FIG. 3) may be selected as a function of the type of PFM control scheme implemented. This control scheme can be selected out of a variety of schemes known to those of skill in the art (for instance the duration of $T_{ON}$ may be controlled directly in certain schemes, while in other schemes $T_{OFF}$ is controlled). It is noted that the embodiments discussed herein are largely "transparent" to the control option selected, so that this point will not be discussed in detail herein.

As discussed herein, $LS_{ON}$ can be assumed to be complementary to $HS_{ON}$ (that is: $LS_{ON}$=1, $HS_{ON}$=0 and $LS_{ON}$=0, $HS_{ON}$=1) and can be reset when $I_L$ goes to zero in a PFM converter operated in discontinuous-conduction-mode or DCM.

To that effect, the zero-current-detector block 18 monitors $I_L$ and produces a signal ZCD which causes the logic circuitry 12 to turn-off the low-side power transistor Mn ($LS_{ON}$=0) as a result of $T_{OFF}$ being concluded.

The zero-current-detector 18 (sometimes referred to also discontinuous-mode-detector DMD) can be implemented as a comparator or a more complex current sensor.

As noted previously, in certain asynchronous converters, a diode can be used as the low-side electronic switch Mn in the place of a transistor such as a power mosfet. In that case the zero-current-detector 18 can be dispensed with: the presence of a diode (through which current can flow only in one direction, e.g. towards the output node $V_O$ and not vice-versa) intrinsically counters forced CCM (continuous-conduction-mode) with zero/low current.

Figure 4:
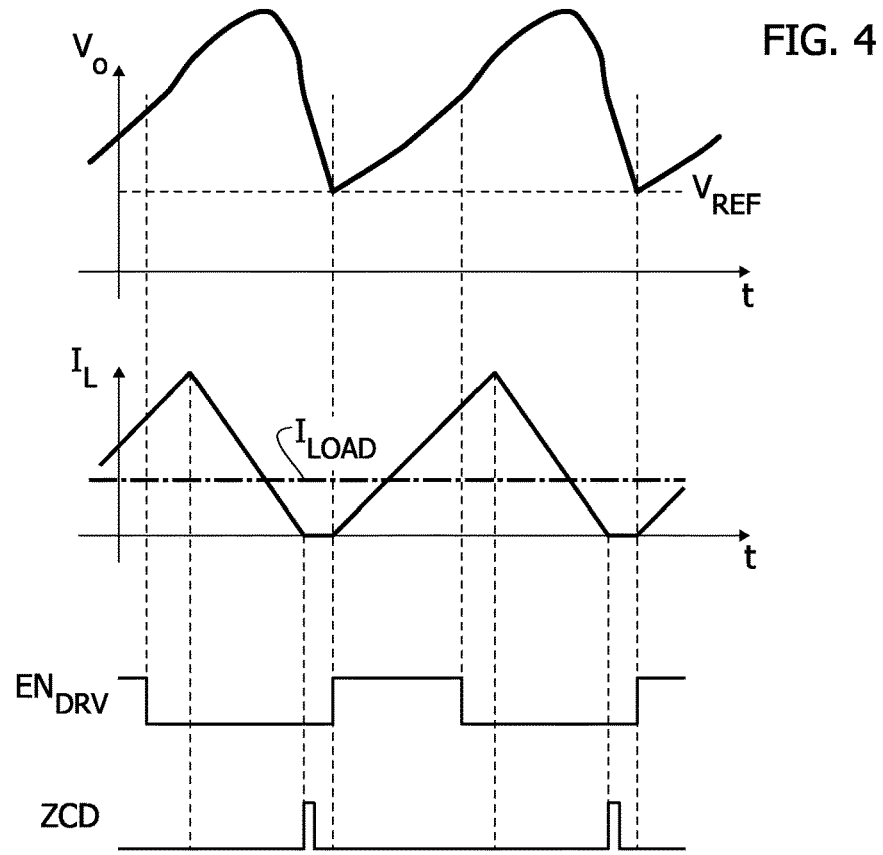
FIG. 4 comprises diagrams exemplary of possible time behavior of corresponding steady-state waveforms.

The diagram of FIG. 4 is illustrative of a possible steady-state behavior of a system as exemplified in FIG. 3 (once again neglecting for the time being the block 160).

The curves in the diagram of FIG. 4 illustrate—from top to bottom, against a common time scale (abscissa scale t) and in arbitrary values—possible time behaviors of: the output voltage $V_O$, with reference to the voltage $V_{REF}$; the current $I_L$ through the inductor L, with reference to the load current $I_{LOAD}$; the signal $EN_{DRV}$ from the comparator 16; and the signal ZCD from the zero-crossing-detector 18.

In a context as exemplified in FIGS. 3 and 4, the choice of the on-time $T_{ON}$ (see the signal ON-TIME from the generator 14) may be dictated by a trade-off between efficiency and output ripple.

For instance—assuming the other operating conditions and/or parameters such as $V_{IN}$, $V_O$, L, and so on are maintained—selecting longer values for $T_{ON}$ and higher values for $I_{L,pk}$ (that is an increased energization of the inductor or coil L, with a higher amount of charge transferred towards the converter output) results in a higher voltage ripple. Conversely, the frequency decreases since a longer time will be taken by the output load LD to discharge the output $V_O$ to a level that triggers the comparator 16, leading to increased efficiency.

A drawback of an arrangement as exemplified in FIGS. 3 and 4 (once again the block 160 is not considered for the time being), lies in that the output ripple is not tightly controlled.

As a result, the output ripple may depend on various converter parameters, such as the inductance of the inductor L, the capacitance of the capacitor C, the input voltage $V_{IN}$, the output voltage $V_O$, the load current $I_{LOAD}$ and the on-time $T_{ON}$.

That is, the output ripple changes for different operating conditions. Additionally, a non-ideal behavior of the comparator 16 may affect the output ripple significantly.

It is noted that these issues can be attempted to be addressed by adopting a "sufficiently large" hysteresis at the comparator 16, so that the amount of charge transferred QPFM produces an increase in the output voltage which is lower than the comparator hysteresis.

In that way, the converter can maintain regulation providing two or more "packets" of charge.

Such an approach offers the advantage of a more controlled output ripple, which is determined by the hysteresis in the comparator 16 amplified by the inverse (reciprocal) of the feedback divider ratio (for simplicity, the converter output voltage $V_O$ shown in FIG. 3 is applied to the comparator 16 directly: in practical implementations, the comparator 16 does not monitor the converter output voltage $V_O$ directly insofar as a feedback divider is used for that purpose).

In that way the output ripple no longer depends on L, C, $V_{IN}$, $V_O$, $I_{LOAD}$ and $T_{ON}$ and remains substantially constant for different operating conditions.

Figure 5:
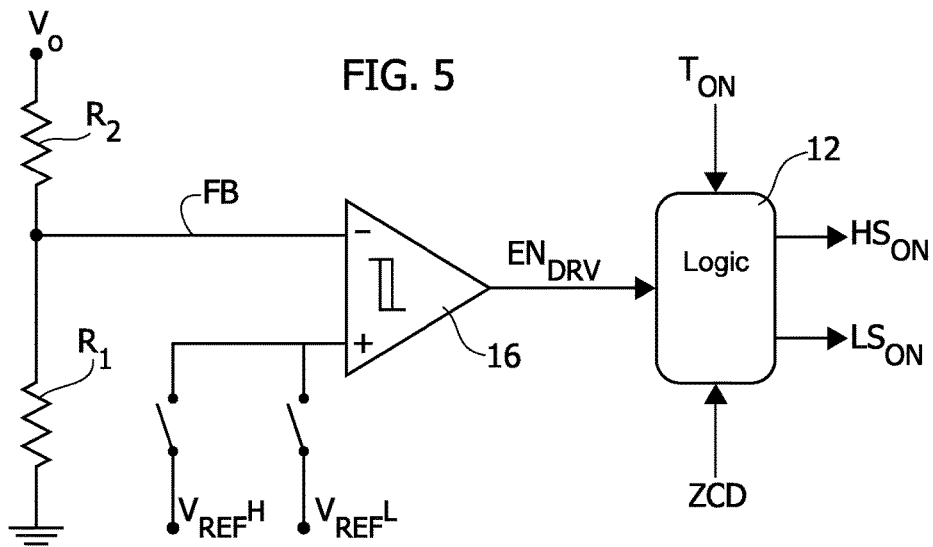
FIG. 5 is a circuit diagram exemplary of a possible implementation of hysteresis in a PFM controller.

The diagram of FIG. 5 is exemplary of a possible implementation of hysteresis in the comparator 16, which is shown to receive the output voltage $V_O$ at its (inverting) input on a feedback line FB via a resistive divider $R_1$, $R_2$, with the reference value changed between high and low values $V_{REF}H$ and $V_{REF}L$ where the comparator reference is changed depending on its state.

For instance: $V_{REF}H$ can be applied to the (non-inverting) input to the comparator 16 on rising edges of $EN_{DRV}$; and $V_{REF}L$ can be applied to the (non-inverting) input to the comparator 16 on falling edges of $EN_{DRV}$.

It will be otherwise appreciated that, in contrast with FIG. 3, where $V_{REF}$ refers to an output voltage $V_O$ applied directly to the comparator 16, the values for $V_{REF}H$ and $V_{REF}L$ exemplified in FIG. 5 are adequately scaled to take into account the feedback factor $R_1/(R_1+R_2)$ applied to the output voltage $V_O$ by the voltage divider comprising R1 and R2.

The output ripple $\Delta V$ can thus be expressed as:

$$\Delta V = ((R_1+R_2)/R_1) * (V_{REF}H - V_{REF}L)$$

where $(V_{REF}H - V_{REF}L)$ is the hysteresis on the comparator, while $(R_1+R_2)/R_1$ is the reciprocal of the feedback factor $R_1/(R_1+R_2)$ of the voltage divider comprising $R_1$ and $R_2$.

Just as an example, a value of 16 mV may be achieved for $\Delta V$ with a feedback factor of 0.5 and a hysteresis 8 mV centered on a "nominal" reference value $V_{REF}$.

A possible drawback of such a "hysteresis" approach may lie in the (very) stringent design of the comparator which ultimately bottom-limits the output ripple amplitude (that is, the output ripple cannot be reduced under a given value and cannot be chosen arbitrarily).

To sum up, the aforementioned analysis and description (again, neglecting the possible structure and operation of the block 160, which will be discussed in the following) shows that in a PFM DC-DC converter a comparator can be used to monitor the output signal $V_O$ against a reference signal $V_{REF}$ indicative of a desired output regulation setpoint.

In steady-state, such an arrangement inherently regulates an output voltage adding an offset with respect to the desired setpoint (this is illustrated in FIG. 4, for instance).

As a result, the average output voltage (that is, its DC value) may not be equal to the desired setpoint $V_{REF}$ insofar as a systematic error (an offset) is introduced.

This error is (strongly) related to the behavior/performance of the PFM comparator (i.e., delay, offset, hysteresis, etc.) that provides a signal such as $EN_{DRV}=1$.

As discussed, such an issue cannot be addressed in a completely adequate manner using a comparator designed with a sufficient amount of hysteresis: a certain output regulation offset still remains, due to non-idealities of such a comparator, for instance, with the behavior and performance of the comparator affected by PVT variations.

Various applications pose strict specifications on the precision and accuracy of the output regulated voltage from a converter.

Such an uncontrolled/aleatory offset is thus undesirable in real-world scenarios, primarily in view of its dependency on converter parameters ($V_{IN}$, $V_O$, $I_{LOAD}$, $T_{ON}$, and so on),
comparator non-idealities and performance/behavior, with converter output regulation and performance facilitated irrespective of possible variations, as due, for instance, to process spread, temperature, component de-rating as well as other events that may occur after final testing, packaging and assembly (i.e., aging, soldering, etc.).

Notionally, one might consider to trim and adjust the reference voltage $V_{REF}$ monitored on the (non-inverting) input of the comparator 16; that is to compensate an undesired output offset by changing the desired regulation set point.

Alternatively, one might consider to trim the feedback divider coupled to $V_O$ (for instance adjusting the value of $R_1$ and/or $R_2$) so that the feedback ratio is adjusted to obtain the correct output regulation.

It is noted that both these approaches may suffer from drawbacks that may militate against considering them practicable in real applications.

For instance, these are open-loop solutions, hardly capable of taking into account temperature variations, aging and other possible phenomena: the trimming action is performed at a given time under certain conditions, and it is adequate (with the output offset compensated) only in these specific conditions.

A variation of any parameter/component in the system after a trimming procedure leads again to an undesired output regulation offset: one may simply consider the case of the comparator, whose behavior and performance are affected by temperature, aging and so on.

Additionally, these possible solutions are not robust in respect of possible changes in DC-DC operative conditions ($V_{IN}$, $V_O$, $I_{LOAD}$, $T_{ON}$, for instance).

As discussed in connection with the first PFM implementation discussed in the foregoing, an output ripple varying as function of $V_{IN}$, $I_{LOAD}$, $T_{ON}$ results in corresponding change in the average value of the output voltage $V_O$.

Also, in certain applications the output regulation set point may not be fixed: a possibility may be given to the user of selecting (possibly on-the-fly) a desired setpoint; under these circumstances, implementing any "trimming" solution becomes hardly feasible.

From the point of view of industrial production and high-volume manufacturing, trimming is inherently expensive: it is time-consuming (an iterative process that takes time to reach convergence) and involves both human resources (operators) and technological resources (automated testing equipment or ATE tools, instrumentation and machinery).

It is noted that these drawbacks are related to the inherent open-loop nature of the trimming actions.

By way of contrast, one or more embodiments may rely on the robustness of a closed loop system in compensating a converter output offset.

To that effect, one or more embodiments may rely on compensation performed via an (analog) feedback loop (negative loop) configured to act on a feedback divider as discussed previously in connection with the resistors $R_1$ and $R_2$ in FIG. 5.

Such an approach lends itself to being implemented within the framework of a converter layout as exemplified in FIG. 3 in the form of the circuitry represented by the block 160, namely circuitry configured to transfer the output voltage $V_O$ to the (inverting) input of the comparator 16 over the feedback line or node FB.

Briefly, one or more embodiments may contemplate injecting into the tap point of the voltage divider $R_1$, $R_2$ (which is coupled to the input of the comparator 16 via the node FB) a current that fixes/changes the voltage at the tap point of the divider (that is at the node FB monitored by the comparator 16).

In that way, the converter 100 can regulate the output voltage $V_O$ without an offset as discussed previously. The amount of current injected can be automatically adjusted by a negative feedback loop.

Figure 6:
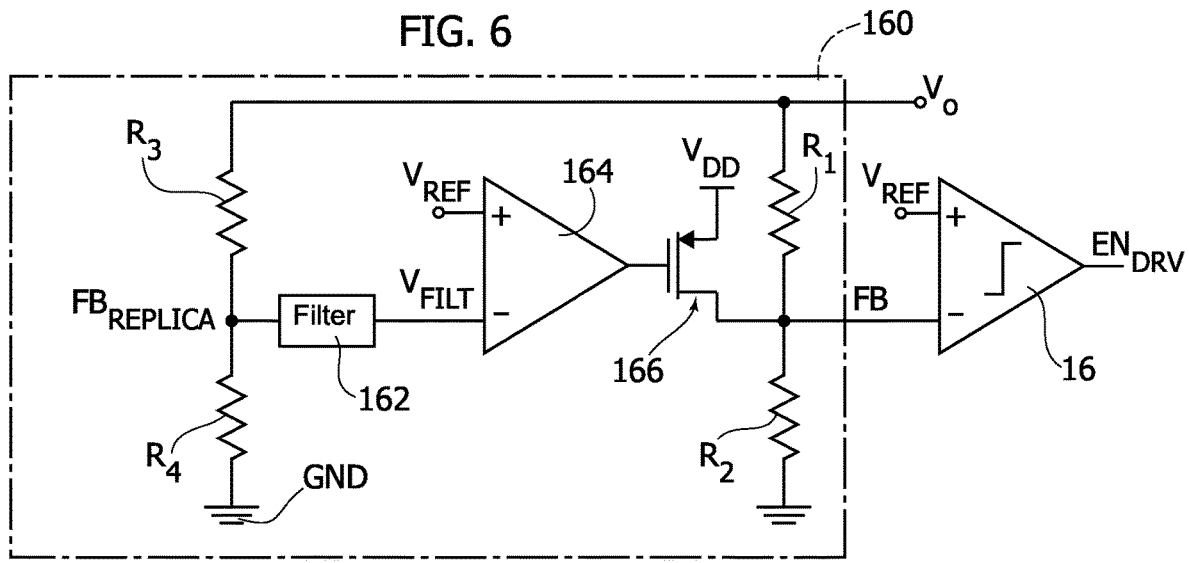
FIGS. 6 and 7 are circuit diagrams exemplary of embodiments as per the present description.
Figure 7:
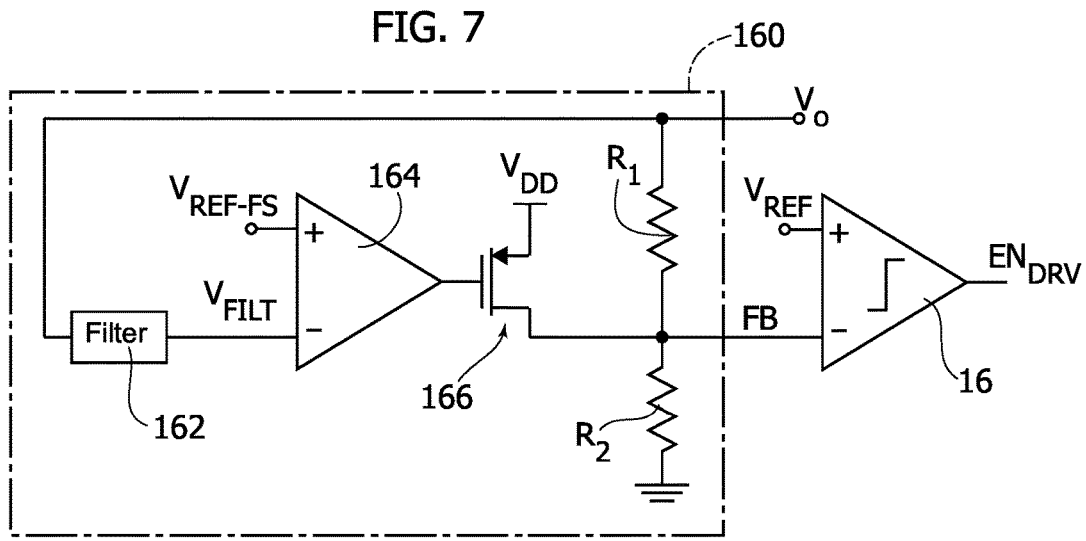

The circuit diagrams of FIGS. 6 and 7 are exemplary of embodiments relying on such an approach.

As noted, FIGS. 6 and 7 essentially illustrate possible embodiments of the circuitry represented by the block 160 in FIG. 3.

For the sake of simplicity and ease of understanding, in FIGS. 6 and 7 parts or elements like parts or elements already discussed in connection with the previous figures are indicated with like reference symbols; a corresponding description will not be repeated for brevity.

In an embodiment as exemplified in FIG. 6, the circuitry 160 includes a "replica" feedback divider including two resistors $R_3$ and $R_4$ coupled between $V_O$ and ground GND and providing at its tap point (designated $FB_{REPLICA}$) a feedback replica of $V_O$ equal to $V_O*R_4/(R_3+R_4)$.

In an embodiment as exemplified in FIG. 6 the partition ratio of the voltage divider comprising $R_3$ and $R_4$ is equal to the partition ratio of the voltage divider including the resistors $R_1$ and $R_2$ having its tap point node FB coupled to the (inverting) input of the comparator 16—that is with $R_4/(R_3+R_4)=R_2/(R_1+R_2)$.

In an embodiment as exemplified in FIG. 6, the signal at the node $FB_{REPLICA}$ is supplied to a low-pass-filter (LPF) 162. The filter 162 provides an average value of the feedback voltage $V_O*R_4/(R_3+R_4)$ from which the ripple is substantially removed, thus providing valuable information on the regulated voltage $V_O$.

In an embodiment as exemplified in FIG. 6, the filtered output voltage $V_{FILT}$ from the low-pass filter 162 is applied to the (inverting) input of an error amplifier 164. The amplifier 164 may comprise an operational amplifier configured to operate as an error amplifier which receives at its other (non-inverting) input the reference voltage $V_{REF}$ and provides at its output an (analog) signal for driving a voltage-controlled current source 166.

In the embodiment as exemplified in FIG. 6, the reference voltage $V_{REF}$—scaled in order to take into account the feedback factor (namely $R_4/(R_3+R_4)=R_2/(R_1+R_2)$)—is thus applied to the (non-inverting) inputs of both of 16 and 164.

In the embodiment as exemplified in FIG. 6, the operational amplifier 164 can be designed (as long as the loop gain of the feedback loop is sufficiently high, which is currently the case since the amplifier 164 can be designed with an adequately high gain at low frequencies) in order to maintain $V_{REF}=V_{FILT}$, acting on the current injected into the feedback node FB via the voltage-controlled current source 166.

As shown in FIG. 6, this may be implemented as transconductance stage, including a transistor (a field-effect transistor such as a P-channel mosfet, for instance).

In the embodiment as exemplified in FIG. 6, the signals at the nodes $FB_{REPLICA}$ and FB convey different information.

In the embodiment as exemplified in FIG. 6, the signal at node FB is, however, affected by the compensation action driven by the signal at node $FB_{REPLICA}$ (low-pass filtered at 162) so that the signal at node FB no longer carries—only—the information related to the output voltage $V_O$ regulated by the converter 100.

In an embodiment as exemplified in FIG. 6, the voltage at node FB is automatically adjusted by the compensation loop including the low-pass filter 162 to eliminate the output regulation offset.

As a result, in one or more embodiments as exemplified in FIG. 6, such a feedback loop facilitates compensation of the output offset (in a steady state) irrespective of the value of the desired setpoint as represented by the reference voltage $V_{REF}$.

Such a compensation loop can be designed to have a bandwidth (much) smaller than the converter bandwidth, which is intended to manage output variations due to load and line transients.

As a result, an output offset compensation loop as discussed herein does not affect DC-DC regulation operation: such a compensation loop has a (much) smaller bandwidth and therefore is unable to "see" and undesirably react to the fast variations expected to be managed by the converter (that is, these variations are too fast for the offset compensation loop which simply filters them out).

In the embodiment as exemplified in FIG. 6, the offset compensation loop slowly adjusts the steady-state output regulation value, continuously integrating the residual error between the signal at node $FB_{REPLICA}$ and the reference voltage $V_{REF}$.

The low-pass filter 162 may be of a simple structure (a first-order RC low-pass filter, for instance) with a sufficiently high input impedance (compared with the impedance of the replica divider $R_3$, $R_4$ as "seen" back from the node $FB_{REPLICA}$) representing an advantageous feature.

In view of the bandwidth specification on the offset compensation loop, such an input impedance can be obtained in a relatively easy manner: for instance, in the case of a first-order RC low-pass filter, a resistance value R can be easily selected as high as 1 MΩ and above.

A compensation loop as discussed herein facilitates mitigating the drawbacks noted in the behavior and performance of a converter such as 100 as discussed in the introductory portion of the instant description. Converter performance, in terms of output regulation accuracy and precision, for instance, is thus ultimately improved.

The circuit diagram of FIG. 7 (where parts or elements like parts or elements already discussed in the foregoing are indicated with like reference symbols so that a corresponding description will not be repeated for brevity) is illustrative of embodiments where the replica feedback divider R3, R4 of FIG. 6 is dispensed with.

In one or more embodiments as exemplified in FIG. 7, the compensation loop can be "closed" by directly monitoring the (regulated) output voltage $V_O$ with the reference (non-inverting) of the operational amplifier 164 having applied thereto a reference value $V_{REF-FS}$ obtained by scaling $V_{REF}$ by a factor which takes into account the partition ratio of the voltage divider $R_1$, $R_2$.

In fact: in embodiments as exemplified in FIG. 6, the error amplifier 164 monitors $V_{FILT}$—which is a low-pass filtered version of the signal at node $FB_{REPLICA}=V_O*R_4/(R_3+R_4)=V_O*R_2/(R_1+R_2)$—against the reference voltage $V_{REF}$; and in embodiments as exemplified in FIG. 7, the error amplifier 164 monitors $V_{FILT}$—which is a low-pass filtered version of $V_O$—against $V_{REF-FS}=V_{REF}*(R_1+R_2)/R_2$.

Embodiments as exemplified in FIG. 7 may take advantage of the fact that in various DC-DC and PMIC arrangements the regulation setpoint is generated by means of a resistor divider (or similar circuitry) starting from a higher reference source, such as a higher voltage source.

In such arrangements, both a scaled value such as the reference voltage $V_{REF}$ and a "full-scale" value such as $V_{REF-FS}$ aligned with $V_O$ may be already available so that no additional circuitry may be involved in generating the reference voltage $V_{REF-FS}$ in embodiments as exemplified in FIG. 7.

One or more embodiments as exemplified in FIGS. 6 and 7 rely on an error amplifier such as 164 that monitors the difference between a desired output setpoint $V_{REF}$ (possibly as provided by $V_{REF-FS}$) and the average value of the output signal $V_O$, and adjusts via a controlled current source such as 166 the feedback (voltage) signal observed by the PFM comparator 16.

As discussed, one or more embodiments as exemplified in FIGS. 6 and 7 implement a closed loop solution, with the related benefits capable (insofar as the compensation loop has an adequately high gain) of compensating the output offset due to factors such as process, voltage, temperature (PVT) variations, aging, components de-rating and similar phenomena, with output offset compensation facilitated irrespective of the desired setpoint $V_{REF}$ and operation parameters such as $T_{ON}$, $I_{LOAD}$ and $V_{IN}$, for instance.

Impact on overall current consumption is negligible insofar as extra consumption is related only to the operational amplifier 164 and the added transistor 166 acting as controlled current source. Neither efficiency, nor power consumption are affected appreciably.

Differences over conventional DC-DC or PMIC solutions in terms of system complexity and area consumption are minor, and largely reciprocated by the resulting advantages.

In those embodiments using two feedback dividers ($R_1$, $R_2$ and $R_3$, $R_4$: see FIG. 6, for instance) a matched layout can be exploited in order to minimize the mismatch between the two. Diffused resistors may be advantageous, since such devices typically provide good performance in terms of matching. If (high) accuracy is desired, a trimming action may be beneficial in order mitigate the effects of mismatch between the two feedback dividers as well as offset in the operational amplifier 164. Such an error amplifier can be devised (with known techniques—such as chopping, for instance) in order to operate with reduced offset and mismatch made substantially negligible.

A (converter) circuit (for instance, 100) as exemplified herein may comprise: a first electronic switch (for instance, $M_P$) and a second electronic switch (for instance, $M_N$) having current paths therethrough (for instance, source-drain in the case of field-effect transistors such as mosfets) coupled at an intermediate node (for instance, A, intermediate the first electronic switch $M_P$ and the second electronic switch $M_N$); an inductor (or coil, for instance, L) having a first end coupled to the intermediate node and a second end coupled (for instance, via a capacitor C) to an output node (for instance, $V_O$) configured to be coupled to an electrical load (for instance, LD, which may be a distinct element from the embodiments) to apply an output signal thereto; and drive circuitry (for instance, 101, 102, 12, 14, 16, 18) of the first electronic switch and the second electronic switch, the drive circuitry configured to cause the first electronic switch and the second electronic switch to switch between a conductive state and a non-conductive state, wherein the first electronic switch during its conductive state provides a current flow line between an input node and said intermediate node and the second electronic switch during its conductive state provides a current flow line between said intermediate node and ground (for instance, GND).

It will be appreciated that reciting the drive circuitry as configured to cause the first electronic switch and the second electronic switch to switch between a conductive state and a non-conductive state does not necessarily imply a positive driving action of both switches: in fact, as discussed previously, in certain asynchronous converters, a diode can be used as the low-side electronic switch Mn in the place of a transistor such as a power mosfet, with the capability for that diode to switch between a conductive state and a non-conductive state even in the absence of a positive forced driving action.

In a circuit as exemplified herein, the drive circuitry may comprise: a first feedback signal path (for instance, $R_1$, $R_2$, 16) coupled to said output node and configured to control (for instance, $EN_{DRV}$, $HS_{ON}$, $LS_{ON}$) switching (the "on" and/or "off" times, for instance, via $T_{ON}$) of the first electronic switch and the second electronic switch between said conductive state and said non-conductive state as a function of the difference between a feedback signal (for instance, FB) indicative (for instance, via the voltage divider $R_1$, $R_2$) of said output signal at said output node and a reference value (for instance, $V_{REF}$); and a second feedback signal path (for instance, $R_3$, $R_4$, 162, 164, 166, 16) comprising a low-pass filter (for instance, 162) coupled to said output node and configured to provide a low-pass filtered feedback signal (for instance, $V_{FILT}$), the second feedback signal path configured (see for instance, 164, 166) to compensate said feedback signal as a function of the difference between said low-pass filtered feedback signal (for instance, $V_{FILT}$) and a respective reference value (for instance, $V_{REF}$ in FIG. 6 or $V_{REF-FS}$ in FIG. 7).

In a circuit as exemplified herein, said second feedback signal path may comprise: a differential circuit (for instance, 164) coupled to said low-pass filter to receive therefrom said low-pass filtered feedback signal ($V_{FILT}$) and configured to produce a difference signal indicative of the difference between said low-pass filtered feedback signal and said respective reference value; and a signal generator (for instance, 166) driven by said differential circuit, the signal generator configured to produce a compensation signal for said feedback signal as a function of said difference signal and to inject said compensation signal into said feedback signal.

In a circuit as exemplified herein, said signal generator may comprise a transconductance circuit, optionally a transistor such as a mosfet transistor, driven by said difference circuit.

In a circuit as exemplified herein, the first feedback signal path may comprise a voltage divider (for instance, $R_1$, $R_2$) coupled to said output node to provide said feedback signal indicative of said output signal at said output node for comparison with said reference value.

In a circuit as exemplified herein, the second feedback signal path may comprise a respective voltage divider (for instance, $R_3$, $R_4$) intermediate said output node and said low-pass filter.

In a circuit as exemplified herein, said voltage divider and said respective voltage divider may: have matched partition ratios, and/or comprise diffused resistors.

In a circuit as exemplified herein, said second feedback signal path may comprise said low-pass filter connected (directly, see FIG. 7) to said output node.

In a circuit as exemplified herein, the first electronic switch and the second electronic switch may comprise transistors, optionally mosfet transistors, having respective control electrodes (for instance, gates in the case of field-effect transistors such as mosfets) driven by said drive circuitry.

As repeatedly noted, this does not represent a mandatory feature insofar as, just to make an example, in certain asynchronous converters, a diode can be used as the low-side electronic switch Mn in the place of a transistor such as a power mosfet.

A device as exemplified herein may comprise: a circuit (for instance, 100) as exemplified herein; and an electrical load (for instance, LD) coupled (for instance, via a smoothing capacitor C) to said output node to receive said output signal therefrom.

A method of operating a circuit or a device as exemplified herein may comprise: applying a supply signal to said input node; and collecting at said output node a converted output signal.

Without prejudice to the underlying principles, the details and embodiments may vary, even significantly, with respect to what has been described by way of example only without departing from the extent of protection.

The extent of protection is determined by the annexed claims.

The invention claimed is:

1. A circuit, comprising:
a first electronic switch and a second electronic switch having current paths therethrough coupled at an intermediate node;
an inductor having a first terminal coupled to the intermediate node and a second terminal coupled to an output node where an output signal is generated;
drive control circuitry configured to control switching of the first electronic switch and the second electronic switch between a conductive state and a non-conductive state, wherein the first electronic switch during the conductive state provides for current flow between an input node and said intermediate node and wherein the second electronic switch during the conductive state provides for current flow between said intermediate node and ground;
wherein the drive control circuitry comprises:
a first feedback signal path coupled to said output node through a first voltage divider circuit and configured to control switching of the first electronic switch and the second electronic switch between said conductive state and said non-conductive state as a function of a difference between a feedback signal generated by said first voltage divider circuit and a first reference value; and
a second feedback signal path comprising a low-pass filter coupled to said output node through a second voltage divider circuit and configured to provide a low-pass filtered feedback signal, the second feedback signal path configured to compensate said feedback signal as a function of a difference between said low-pass filtered feedback signal and a second reference value which is identical to said first reference value;
wherein said first and second voltage divider circuits have equal partition ratios.

2. The circuit of claim 1, wherein said second feedback signal path comprises:
a differential circuit coupled to receive said low-pass filtered feedback signal from said low-pass filter and configured to produce a difference signal indicative of the difference between said low-pass filtered feedback signal and said second reference value; and
a signal generator driven by said differential circuit, the signal generator configured to produce a compensation signal as a function of said difference signal and to inject said compensation signal into said feedback signal.

3. The circuit of claim 2, wherein said signal generator comprises a transconductance circuit driven by said differential circuit.

4. The circuit of claim 3, wherein the transconductance circuit is a transistor having a control terminal driven by the difference signal.

5. The circuit of claim 1, wherein said first and second voltage dividers have matched partition ratios.

6. The circuit of claim 1, wherein said first and second voltage dividers comprise diffused resistors.

7. The circuit of claim 1, wherein the first electronic switch and the second electronic switch comprise transistors having respective control electrodes driven by said drive control circuitry.

8. The circuit of claim 1, further comprising a load connected to said output node.

9. A circuit, comprising:
a first electronic switch and a second electronic switch having current paths therethrough coupled at an intermediate node;
an inductor having a first terminal coupled to the intermediate node and a second terminal coupled to an output node where an output signal is generated;
drive control circuitry configured to control switching of the first electronic switch and the second electronic switch between a conductive state and a non-conductive state, wherein the first electronic switch during the conductive state provides for current flow between an input node and said intermediate node and wherein the second electronic switch during the conductive state provides for current flow between said intermediate node and ground;
wherein the drive control circuitry comprises:
a first feedback signal path coupled to said output node through a voltage divider circuit and configured to control switching of the first electronic switch and the second electronic switch between said conductive state and said non-conductive state as a function of a difference between a feedback signal generated by said voltage divider circuit and a first reference value; and
a second feedback signal path comprising a low-pass filter directly electrically connected to said output node and configured to provide a low-pass filtered feedback signal, the second feedback signal path configured to compensate said feedback signal as a function of a difference between said low-pass filtered feedback signal and a second reference value;
wherein said second reference value is different than said first reference value.

10. The circuit of claim 9, wherein said second feedback signal path comprises:
a differential circuit coupled to receive said low-pass filtered feedback signal from said low-pass filter and configured to produce a difference signal indicative of the difference between said low-pass filtered feedback signal and said second reference value; and
a signal generator driven by said differential circuit, the signal generator configured to produce a compensation signal as a function of said difference signal and to inject said compensation signal into said feedback signal.

11. The circuit of claim 10, wherein said signal generator comprises a transconductance circuit driven by said differential circuit.

12. The circuit of claim 11, wherein the transconductance circuit is a transistor having a control terminal driven by the differential signal.

13. The circuit of claim 9, wherein voltage divider comprises diffused resistors.

14. The circuit of claim 9, wherein the first electronic switch and the second electronic switch comprise transistors having respective control electrodes driven by said drive control circuitry.

15. The circuit of claim 9, further comprising a load connected to said output node.

16. The circuit of claim 9, wherein the first and second reference values have a scaled relationship as a function of a partition ratio of said voltage divider circuit.

17. A circuit, comprising:
a first electronic switch and a second electronic switch having current paths therethrough coupled at an intermediate node;
an inductor having a first terminal coupled to the intermediate node and a second terminal coupled to an output node where an output signal is generated;
drive control circuitry configured to control switching of the first electronic switch and the second electronic switch between a conductive state and a non-conductive state, wherein the first electronic switch during the conductive state provides for current flow between an input node and said intermediate node and wherein the second electronic switch during the conductive state provides for current flow between said intermediate node and ground;
wherein the drive control circuitry comprises:
a comparator circuit having a first input configured to receive a reference value, a second input and an output;
a first voltage divider circuit connected to said output node and having a first tap node configured to generate a feedback voltage directly applied to the second input of the comparator circuit;
a transistor having a source drain path coupled to source a compensation current directly to the second input of the comparator circuit and a gate terminal;
a differential amplifier circuit having a first input coupled to receive a second reference value, a second input and an output coupled to drive the gate terminal;
a low-pass filter circuit having an input coupled to the output node and an output coupled to the second input of the differential amplifier circuit.

18. The circuit of claim 17, wherein the input of the low-pass filter is directly connected to the output node and the first and second reference values are different.

19. The circuit of claim 17, wherein the input of the low-pass filter is coupled to the output node through a second voltage divider circuit and the first and second reference values are the same.

20. The circuit of claim 17, wherein the first electronic switch and the second electronic switch comprise transistors having respective control electrodes driven by said drive control circuitry.

21. The circuit of claim 17, further comprising a load connected to said output node.

* * * * *